Aug. 11, 1964  G. T. SORENSON  3,144,280
SEAL ASSEMBLY IN COMBINATION WITH A SHAFT MOUNTED ROLLER
Filed June 6, 1962
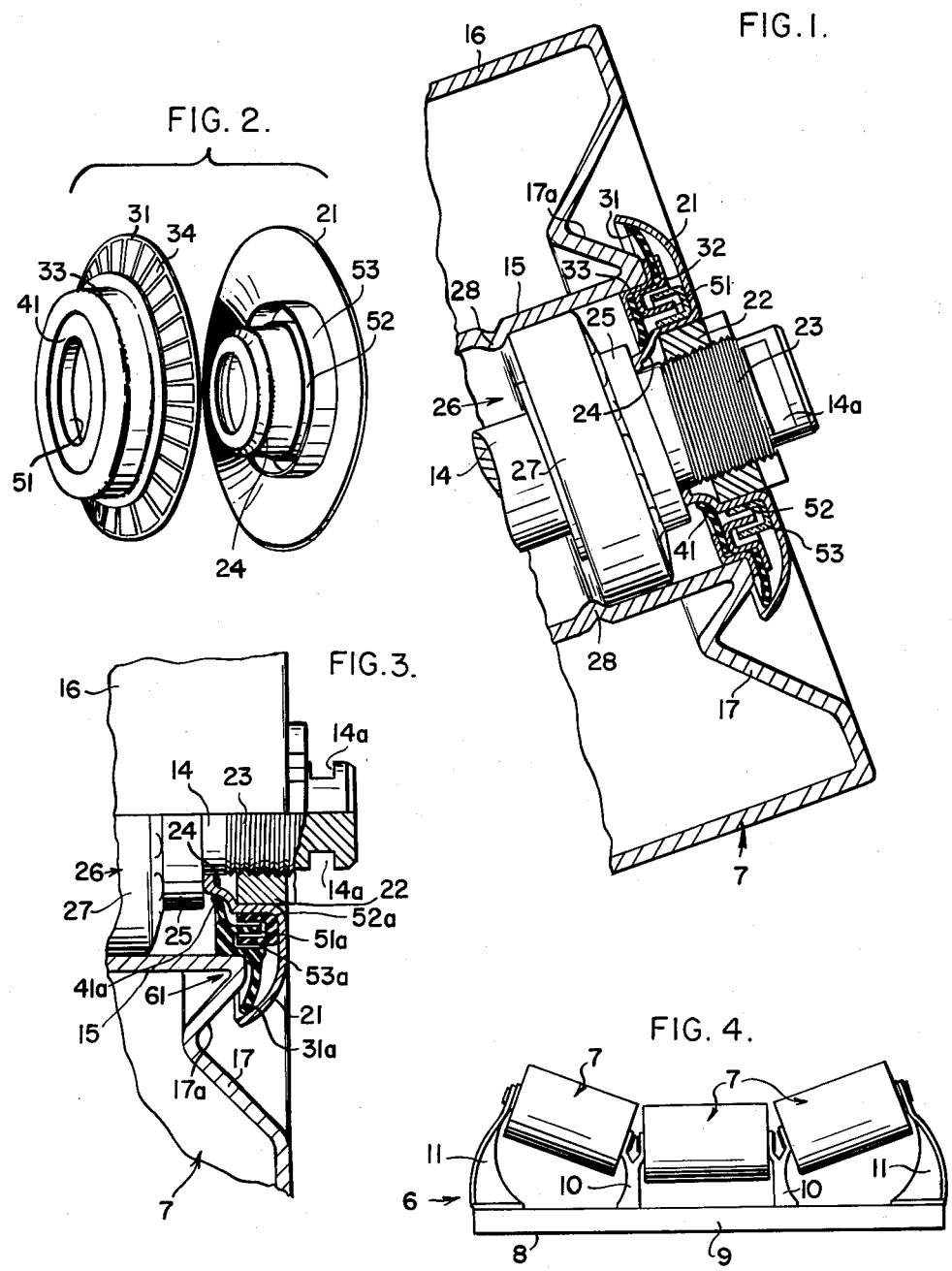

United States Patent Office 3,144,280
Patented Aug. 11, 1964

3,144,280
SEAL ASSEMBLY IN COMBINATION WITH A SHAFT MOUNTED ROLLER
Gerald T. Sorenson, Louisville, Ky., assignor to Chain Belt Company, Milwaukee, Wis., a corporation of Wisconsin
Filed June 6, 1962, Ser. No. 200,425
6 Claims. (Cl. 308—36.1)

This invention relates to seals for bearings supporting the rotating part on a non-rotating shaft. The invention is particularly intended for sealing the ends of conveyor rolls for a belt conveyor. Such a conveyor may be located in a mine subject to flooding or across open country and without cover except as may be required by the material transported. The bearing seals must provide complete protection against water and dirt but must be inexpensive and fit within limited axial dimensions. Where necessary, the seal must also prevent the discharge of the grease delivered under pressure to the bearing. However, it may also be necessary for some types of bearings that the seal readily allow the discharge of the old grease which is displaced by that delivered to the bearing.

According to the invention, the seal comprises an outer, non-rotating concave shield and a flexible, rotating annular element which is supported at its inner edge so that its outer edge engages the periphery of the inside of the shield facing the roll. The rotating flexible element also operates as a slinger behind the shield to reject water and particles entering the annular space between the element and the end of the conveyor roll or rotating part. The bearing seal may further include an oppositely disposed inner seal and interfitting flanges forming a labyrinth intermediate the two seals. The inner seal and labyrinth may be used together where the severity of the conditions require, or alternatively. Generally, the inner seal would be used where it is necessary that the grease applied to the bearing under pressure be retained. Where purging or displacement of the old grease is required, the inner seal would not be used, but the labyrinth would provide the additional protection of a double seal.

An object of the invention is to provide an improved seal having two axially assembled parts.

Another object is to dispose the seal so that it is protected from any direct forces such as from sand or rain driven by winds at high velocity.

Another object is to provide a seal of two axially assembled parts to comprise inner and outer, oppositely facing wiping seals and an intermediate labyrinth seal.

Another object is to fit said three seals within a relatively small axial dimension.

Another object is to provide a seal having a very small drag or a low resistance to rotation.

The drawings furnished herewith illustrate the best mode of carrying out the invention as presently contemplated and set forth hereinafter.

In the drawings:

FIGURE 1 is an enlarged axial cross-section of one end of a conveyor roll showing a construction of the seal;

FIG. 2 is a perspective view of the rotating and fixed assemblies comprising the seals;

FIG. 3 is a cross-section of a part of the end of a conveyor roll showing the parts of the seal of molded construction; and FIG. 4 is a front elevation of an idler comprising three rolls of the type shown in part in FIGS. 1 and 3.

The conveyor idler 6 shown in the drawings includes the three rolls 7 and the supporting stand 8 which comprises the base 9 and columns 10 and 11. The ends of rolls 7 supported by columns 11 at the ends of base 9 are higher than the adjacent ends of the rolls supported by the intermediate columns 10 whereby the conveyor belt, not shown, is supported by the idler to form a trough for the transport of the bulk material.

Each roll 7 is mounted on a shaft 14 extending through the roll and having milled slots 14a at each end or other suitable means by which each end of the shaft is conveniently secured and supported by column 10 or 11. Each roll 7 is of identical construction whereby the several rolls of idler 6 may be interchanged on stand 8 and each end of each roll 7 is also of identical construction so that each roll may also be reversed end-for-end between columns.

Each roll includes a central tube 15, an outer cylindrical shell 16 and connecting end discs 17. As shown in FIGURE 1, disc 17 is recessed annularly to accommodate the dished shield 21 which is press fit over the nut 22 fitting threads 23 of shaft 14. The smaller, inner end 24 of shield 21 pushes against the inner race 25 of the bearing 26 supporting the end of roll 7 on shaft 14. The outer race 27 of the bearing fits within tube 15 and is located against the projections 28 extending inwardly from tube 15.

The outer periphery of the flexible, annular seal or wiping element 31 engages the concave surface of shield 21 near the periphery thereof and the inner periphery of element 31 is clamped between outwardly extending flanges of the stamped metal inner and outer rings 32 and 33.

Rings 32 and 33 are secured by a press-fit within the end of tube 15 and are supported by the tube concentrically with and within shield 21. Wiping element 31 may be of any suitable, oil and wear resistant flexible material but if the material is not sufficiently stiff or is subject to setting or cold flow, the spring washer 34 may be secured between the outer flange of ring 33 and element 31 so that the radially projecting fingers of spring washer 34, as shown in FIG. 2, will hold the outer periphery of element 31 against shield 21.

The outer periphery of the flexible, annular seal element 41 is secured between the inwardly extending flanges of rings 32 and 33 so that the inner periphery of element 41 engages the inner end 24 of shield 21. End 24 of shield 21 as shown is shaped to provide a concave profile for engagement by element 41. However, the profile may be other than that shown, provided that internal pressure against element 41 exerted in the outward direction or toward the end of roll 7 tends to press the element into tighter engagement therewith.

The intermediate labyrinth seal as shown in FIGURE 1 includes cylindrical element 51 projecting from the periphery of the inner flange of ring 32. Element 51 turns with roll 7 between the inner and outer concentric rings 52 and 53 which are fixed within shield 21. Rings 52 and 53 are joined by an intermediate section with which they are integrally formed and fit tightly on the section of shield 21 directly fitting over nut 22.

The several seals may comprise the rotating assembly and the fixed assembly as shown in FIG. 2. The rotating assembly includes rings 32 and 33 carrying the seal elements 31, 41 and 51 and is carried by the projecting portion of the rotating part, namely the end of tube 15 of roll 7.

The non-rotating assembly includes shield 21 providing the concentric, inner and outer wiping surfaces for elements 41 and 31, respectively, and the inner and outer rings 52 and 53 to receive element 51 therebetween for relative rotation without contact. The non-rotating assembly is fixed on nut 22 which is turned on shaft 14 only until the inner end 24 of shield 21 contacts inner race 25 of bearing 26. It is essential that the bearing itself or in association with other bearing means provide and maintain the axial and radial disposition of the two assemblies relative to each other.

The rotating and non-rotating assemblies may be of various constructions including the integrally molded rotating assembly 61 shown in FIG. 3, and which includes the inner and outer flexible elements 41a and 31a, respectively, and the element 51a. Rings 52a and 53a may also be of molded construction as shown in FIG. 3.

The assemblies shown and described provide a series of three seals, the innermost being disposed to prevent passage of grease outwardly and the outermost seal having a rotating element which acts as a slinger and prevents entry of material. The annular space between element 31 and the end disc 17 is of a diminishing cross section to prevent material from collecting within the space. For that purpose, end disc 17 includes the tapered or conical portion 17a which adjoins tube 15 and which is disposed so that the width of the space referred to increases toward its annular outer opening defined by the disc 17 and the edge of shield 21. The intermediate labyrinth seal necessarily provides only a measure of additional protection which is, nonetheless, of extreme importance in many cases. However, the outer seal provided by element 31 and shield 21 may also be used with either or both the inner and intermediate seals, or with neither.

Element 31 is fully protected behind shield 21. The seal-joint therebetween at the periphery of the two parts faces outwardly and angularly toward the end of the rotating part. This relationship provides a seal of particular effectiveness with a relatively small amount of pressure closing the joint. The seal accordingly protects the bearing with a minimum of resistance to rotation, or drag. This is especially important where a large number of seals operate together as in a belt conveyor.

Various modes of carrying out the invention are contemplated as within the scope of the following claims particularly pointing out and distinctly claiming the subject matter which is regarded as the invention.

I claim:

1. In combination with a rotatable roller or the like having a bearing opening and a supporting shaft having means for securing a bearing therein, a circular concave shield having a base mounted on said means and spaced from said end of the roller with the concave side of the shield facing and overlying the bearing opening, and opposite annular, normally flat, resilient, flexible wiping elements having intermediate supporting means mounted in the bearing opening and supported by the roller within the shield with the outer periphery of the outer element engaging the concave side of the shield at or near the periphery thereof and the opposite inner element engaging the base of the shield, said elements being flexed in the same direction by said first named means whereby the inner element serves to retain lubricant in the bearing opening and the outer element serves to close the bearing opening, the axial adjustment of said shield and its base on said shaft in said direction in effecting the compression of the outer element and expansion of the inner element also providing the desired wiping pressures of the respective seals.

2. In combination with a fixed shaft and rotatable roller having a central, axial bore for said shaft and a bearing mounted thereon and within said bore and spaced from the end of the roller; inner and outer normally flat, annular, flexible, resilient axially spaced wiping elements having a rigid intermediate ring connecting the outer periphery of the inner element and the inner periphery of the outer element, said ring being fitted within said bore and projecting therefrom with the inner element disposed within the bore of the roller and the outer element spaced from and overlying the end of the roller, and a circular shield overlying said outer element and having a hub fitted on said shaft and extending within said ring with a clearance therebetween, the side of said shield facing said outer element being concave to receive the projecting end of said ring and including a generally frusto-conical, inwardly facing wiping surface at the periphery of the shield and engaging the outer periphery of said outer element to form a dirt seal, the end of said hub within said ring having a radially outward facing generally frusto-conical wiping surface at the periphery thereof which engages the inner periphery of said inner element to form a grease seal, the axial adjustment of the hub and shield on said shaft toward the roller to deflect the elements in the same direction and effect the expansion of the inner element and compression of the outer element providing the desired wiping pressures of the respective seals.

3. The combination of claim 2 which includes the bearing referred to and which bearing includes an inner race adjustably secured on said shaft by the hub of said shield.

4. The combination of claim 2 wherein the outer element includes a metallic, spring member having radially outward extending fingers supplementing the wiping pressure of the dirt seal.

5. The combination of claim 2 wherein the space between the end of the roller and outer element has a radially outward opening defined by the end of the roller and the outer periphery of the shield whereby said outer element is operable as a slinger to reject particles past the dirt seal.

6. The combination of claim 2 wherein the ring and shield include concentric, oppositely extending annular projecting members forming a labyrinth seal intermediate the dirt and grease seals.

References Cited in the file of this patent
UNITED STATES PATENTS

| | | |
|---|---|---|
| 2,657,104 | Kayser | Oct. 27, 1953 |
| 2,868,567 | Kindig | Jan. 13, 1959 |
| 3,101,954 | Huddle | Aug. 27, 1963 |

FOREIGN PATENTS

| | | |
|---|---|---|
| 1,185,488 | France | Feb. 16, 1959 |